Patented Jan. 18, 1927.

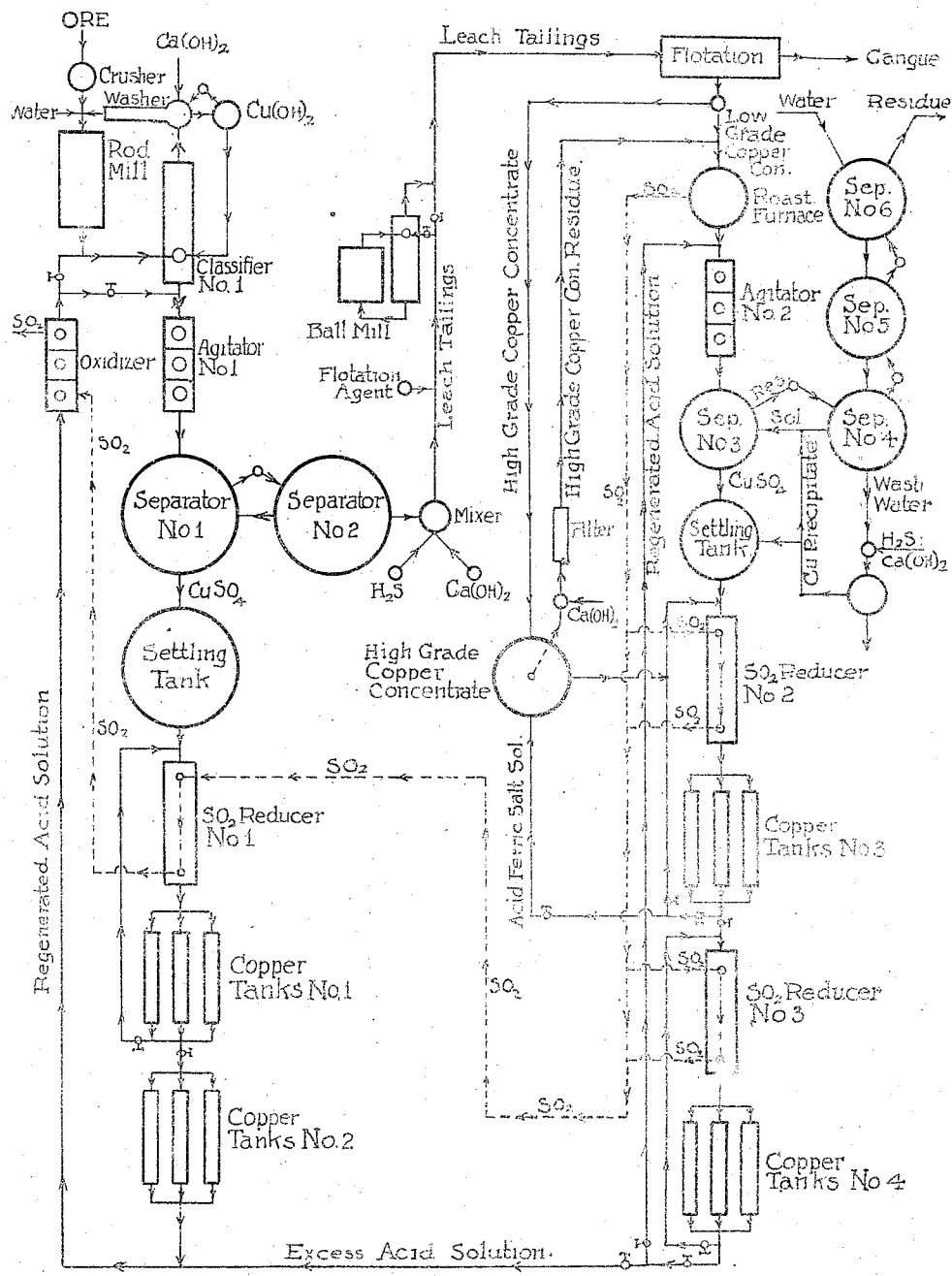

1,614,668

UNITED STATES PATENT OFFICE.

WILLIAM E. GREENAWALT, OF DENVER, COLORADO.

COPPER-EXTRACTION PROCESS.

Application filed October 5, 1925, Serial No. 60,577. Renewed July 20, 1926.

The invention relates more particularly to the extraction of copper from its ores in which the copper occurs partly as the oxide (including carbonates and silicates) and partly as the sulphide.

The treatment of these mixed ores, which are quite common in the United States, has presented something of a problem, for the reason that methods which are applicable to the treatment of oxides (including carbonates and silicates), are not applicable to the treatment of sulphides, and vice versa. Various methods have been proposed for the treatment of mixed copper ores, among which may be mentioned the flotation treatment for the extraction of the sulphides followed by leaching for the extraction of the oxides; treating the mixed ore with a leach solution and precipitating the copper in the ore pulp with iron and floating both the sulphides and the precipitated copper; leaching the ore in large leaching vats to extract the copper from the oxides followed by re-grinding and flotation of the leach tailings to extract the sulphides; and leaching in large leaching vats with a ferric iron solution which is a solvent for the copper in its oxide and some of its sulphide mineralogical combinations.

All of these methods have certain restrictions and limitations as well as some complications, which it is believed can be reduced or avoided by the present process, and the object of the present process is to extract the copper from mixed ores by a combination leaching, concentration, and electrolytic method, so related that the process can be carried out continuously, expeditiously, and cheaply, altho it is not intended to limit the process to the treatment of mixed ores alone.

In the treatment by flotation followed by leaching a serious difficulty arises in the dewatering of the flotation residue, and as the ordinary thickeners leave about 50% water in the residue, under ordinary conditions of leaching this would seriously affect the leach solution, especially when taken in connection with the large amount of wash water resulting from washing the leach residue. If the copper is precipitated with iron in the ore pulp before flotation the recovery is not always satisfactory and the results are more or less erratic. If the ore is crushed coarse and leached in large leaching vats, and the residue treated by flotation, an extra grinding, after leaching, is necessary to get the ore fine enough for flotation, and the extra handling of the ore is a considerable item of expense. If acid and ferric sulphate leaching is used, the process appears simple and economical, but most copper ores contain at least some of the copper as chalcopyrite, bornite, or associated with pyrite, and in such mineralogical combinations the copper is practically unaffected by either acid or ferric salt solution at ordinary temperatures and in an ordinary time. Even in chalcocite, while the first atom of copper of the $Cu_2S$ is readily dissolved by ferric sulphate, the second atom of copper is only extracted with considerable difficulty, so that a long time is required to effect a satisfactory extraction of the total copper content of the ore, and this usually involves serious leaching difficulties. If the ore contains appreciable amounts of gold and silver, as is frequently the case, these metals are lost in the residue.

In most mixed ores, that is to say, ores containing the copper both as the oxide and the sulphide, the sulphide is frequently coated with an oxide (usually carbonate) film. The oxide in the ore is usually the result of the oxidation of the sulphide, and while much of the oxide coating may be removed by grinding, nevertheless, it cannot be so perfectly removed as not to present a serious difficulty in many, or most, cases for the best conditions for flotation. If, on the other hand, the oxidized portion of the copper in the ore is first removed by a solvent process, the sulphide copper is fully exposed and the best conditions are obtained for successful flotation, with the consequent highest total extraction of the copper, both from its oxide and its sulphide combinations. Leaching before flotation presents certain decided advantages over leaching after flotation, among which is usually a higher total copper extraction.

Where leaching precedes flotation, or constitutes the entire process, the ore is practically always crushed dry. Dry crushing, with the accompanying screening, is expensive and quite a nuisance if the crushing is fine enough for flotation. Fine dry grinding of low grade copper ores is rarely, if ever, attempted for leaching.

Wet grinding is much to be preferred, because it is cheaper than dry grinding, and the screening and dust nuisances are avoided. The difficulty, however, arises that the water necessary for wet grinding has to be eliminated to avoid undue dilution of the solvent, and it is quite impractical to dewater the ore pulp to as low as about 50% without filtering, and filtering is too expensive in the treatment of low grade ores. Then, again, under conditions of operation large quantities of wash water have to be applied to the acid leach residues to recover the soluble copper. The loss of acid by this excessive addition of water and the precipitation of the copper from the large volume of wash water present serious economic problems.

The cost of the acid required for leaching also presents a serious problem in copper mining districts. In small leaching plants an acid plant would be too expensive both of installation and operation. Acid could not ordinarily be delivered in any ordinary mining district for less than about $20. per ton, and even if manufactured on the ground the cost would be about $10. per ton. Under ordinarily favorable conditions the acid consumption, per pound of copper dissolved from low grade oxidized ore, would be about four pounds, and this would represent an acid cost alone of from two to three cents, per pound of copper. This acid cost is avoided in the present process, and the acid expense for leaching is practically nothing. It is highly desirable also that all of the copper should be obtained as the electrolytic metal, salable direct to the consumer, to avoid excessive transportation and refining charges. This, too, is realized in the present process.

The process will now be described by referring to the accompanying drawing, which is a flow sheet in diagrammatic plan.

The ore, which may be presumed to be crushed to about ¼ inch in the primary crusher, is fed into the rod mill, where it is ground to, say, 48 mesh, which may be presumed to be the fineness required for the effective flotation of the sulphides, as determined by experimentation. A rod mill is preferred for fine grinding, since that will require the least amount of water and have the least amount of returned oversize, and consequently a small circulating load, and this oversize may be kept fairly low, even as low as 25% and lower, without appreciably reducing the efficiency of the rod mill.

When the finely ground pulp, containing, say, about 25% water, issues from the rod mill, it is mixed with about three times the amount of acid solution obtained in a subsequent step in the process. This will give about the right portion of liquid to solids for classification to 48 mesh. This acid pulp then flows into the classifier No. 1 where the acid solution acts upon the copper in the ore to dissolve it, while at the same time a classification to 48 mesh is made. The minus 48 mesh passes to the agitator No. 1, while the oversize is returned to the rod mill for regrinding.

For purposes of illustration, the ore may be supposed to contain 1%, or 20 pounds of recoverable copper per ton, as the oxide, and 1%, or 20 pounds recoverable copper as the sulphide, and the acid in the acid solution, mixed with a relatively small amount of water, may be assumed to contain 1.5% acid. If the acid solution contains a small amount of copper from previous applications and 16 pounds of the 20 pounds of copper is dissolved in the classifier No. 1, the oversize returned to the rod mill, containing about 50% moisture, would contain about 1.1 pounds acid per ton of ore and about 0.8 pound of soluble copper, if the oversize were not given any washing. As this amount of acid and soluble copper going through the rod mill might have an injurious effect, provision is made to avoid this. If the oversize is very slightly washed, the acid content may be reduced to about 0.5 pound per ton of ore, and the soluble copper content to about 0.4 pound. But whether the oversize is washed or not, it is preferred to neutralize this excess acid and precipitate the soluble copper before returning the oversize to the rod mill. This is preferably done by adding a small amount of caustic lime to the oversize, and it may conveniently be added to the bowl of the washer which returns the oversize from the classifier to the rod mill. In this way any injurious effect of excess acid in the oversize is avoided. Caustic lime is inexpensive, and the loss of a pound or two of acid per ton of ore is not of any great consequence. The copper in the oversize, precipitated by the caustic lime as the hydroxide, is easily and almost instantaneously redissolved in the acid solution in the classifier with the copper in the new ore introduced into the rod mill with the oversize. The water in the oversize can be arranged to provide the 25% water for grinding in the rod mill, either wholly or partly. If a pool of caustic solution is maintained in the washer, the copper hydroxide may be washed into a tank and settled. The overflowing caustic solution is returned to the washer, while the settled copper hydroxide is flowed into the classifier where it is redissolved.

The 48 mesh overflow from the classifier No. 1, flows into the agitator No. 1, where the ore is treated long enough to get the desired extraction of the copper from the oxides. If more acid is required than that introduced into the classifier No. 1, it is added to the ore as it flows into the agitator.

The acid treated pulp from the agitator flows into the separator No. 1, where the rich copper solution overflows into the settling tank, and the thickened pulp is pumped into separator No. 2, where it may be slightly washed, and the rich wash water added to the rich copper solution, and the pulp thickened to contain about 50% water. This thickened pulp still contains a small amount of acid and a small amount of soluble copper. If acidity of the pulp is required for the most effective flotation of the sulphides, no further attention need be paid to the excess acid in the leached pulp. If, however, the acidity is not desired, the acid can readily be neutralized with a small amount of caustic alkali, such as calcium hydroxide. The small amount of soluble copper remaining in the leach residue is precipitated, preferably as the sulphide, with hydrogen sulphide or calcium sulphide, and this sulphide copper precipitate is easily and effectively floated, with practically a theoretical recovery, with the natural copper sulphides in the ore.

If the leach residue needs finer grinding than, say 48 mesh, it may be ground in the ball mill to any mesh desired, and this regrinding will also serve to thoroughly mix the ore pulp and the flotation agent.

The copper sulphate solution issuing from the separator No. 1, flows into the settling tank, and the clear settled solution flows into the $SO_2$ reducer No. 1, where the solution is treated with a reducing agent, such as sulphur dioxide, which converts the injurious ferric iron into the harmless ferrous iron, as a desirable preparatory step in the electrolytic deposition of the copper, as explained in detail in my Patents No. 1,353,995, Sept. 28, 1920, and No. 1,483,056, Feb. 5, 1924.

The reduced solution then flows into the copper tanks No. 1, where the copper is electrolytically deposited with the simultaneous regeneration of acid and ferric iron. A portion of the copper solution issuing from the copper tanks No. 1, is returned cyclically to the $SO_2$ reducer to reduce the ferric iron formed by the electrolysis to the ferrous condition, while another portion—the advance flow—passes on to the copper tanks No. 2. In the copper tanks No. 1, where most of the copper is preferably deposited, the ferric iron from the outflowing solution from the tanks is maintained rather low, say, about 0.25% for good work, and the inflowing solution from the reducer will contain only a very small amount, or practically no ferric iron. In this way, with a low current density, a high electrical efficiency is obtainable, with the deposition of a practically pure electrolytic copper.

The advance flow from copper tanks No. 1, containing say, about 0.25% ferric iron, flows into copper tanks No. 2, where the ferric iron is allowed to accumulate, as determined by experimenting to be best, or say about 0.5%. The electrical efficiency will drop somewhat with this percentage of ferric iron in the electrolyte, but as the object in these tanks is to accumulate ferric iron for leaching, the high electrical efficiency is not so essential as in copper tanks No. 1.

The solution, largely depleted of its copper and containing, say, from 1.0% to 1.5% acid, and 0.5% ferric iron, may be returned direct to the classifier No. 1, where more copper is dissolved from fresh ore and the cycle repeated, or it may first be passed through the oxidizer, where it is agitated with air, and preferably with sulphur dioxide as an oxidizer, as applied to this case, to convert more ferrous iron to ferric iron, since ferric iron acts more or less energetically on the very fine sulphides in the ore in the form of chalcocite, and may effect an additional saving of copper.

The leached ore residue, now practically freed of its oxidized copper, and in which the sulphides are thoroughly cleaned and exposed for flotation, flows into the flotation machine, where the sulphides are separated from the gangue, with a high percentage of recovery. The gangue, being valueless, is wasted, and is eliminated from further consideration. The sulphide concentrate, containing the 1.0%, or 20 pounds, of recoverable copper, as sulphide in the original ore, may be presumed to be associated with about 80 pounds gangue, or foreign matter such as iron and silica, and would represent a concentrate containing 20% or 400 pounds of copper per ton of concentrate.

It will be seen that at this point of the process, the 1.0% copper has been recovered from the oxide of the original ore as the electrolytic metal, and the other 1.0% as about 100 pounds of a 20% sulphide copper concentrate, and at very little expense for dewatering or washing, or the precipitation from large quantities of lean wash water.

This concentrate could be shipped to the smelter and smelted in the ordinary way under the ordinary conditions, but as the concentrate contains a large amount of sulphur, available for sulphuric acid leaching and sulphur dioxide reduction, it is preferred to use it for that purpose as will now be described.

The concentrate is preferably divided into a rich and lean portion, assuming that the concentrate consists largely of chalcocite, $Cu_2S$. This separation can easily be made either by flotation or gravity concentration, and would give, for example, a small portion of high grade concentrate containing about 60% copper and a relatively large portion containing about 8% copper. The low grade concentrate is roasted, preferably with a view of making as much as possible of the copper soluble in water, as the sulphate. From 70% to 90% of the copper can be made water soluble by careful roasting. The roasted low grade concentrate is leached in agitator No. 2 with a dilute acid solution, and the resulting mixture of residue and copper solution is flowed into the separator No. 3, where the rich copper solution is separated from the residue, and flows into the settling tank for clarification preparatory to electrolysis. The residue may be washed in separators 4, 5, and 6, and the richer portion of the wash water added to the rich copper solution. The copper in the lean portion of the wash water may be chemically precipitated, as, for example, with hydrogen sulphide or caustic lime and the precipitate redissolved in the rich copper solution. In this way the chemically precipitated copper may be converted into the electrolytic metal at a small cost, with the rest of the copper. The residue may be wasted.

The high grade copper sulphide concentrate is transferred to the high grade copper concentrate tank.

The rich copper solution flows into the $SO_2$ reducer No. 2, where ferric iron is reduced to the ferrous state, and then flows to the copper tanks No. 3, where copper is deposited and acid and ferric iron regenerated. A portion of the copper solution flows in a closed circuit between the $SO_2$ reducer No. 2 and the copper tanks No. 3, while another portion—the advance flow—passes on to the $SO_2$ reducer No. 3, and from there to the copper tanks No. 4. A portion of the solution flows in a closed circuit between the reducer No. 3 and the copper tanks No. 4, while another portion—the advance flow—is returned to the roasted concentrate, to pass through another complete cycle.

The solution, preferably from the copper tanks No. 3, may be reduced entirely or partly by the high grade sulphide concentrate. The first atom of copper of the $Cu_2S$ is easily dissolved by the ferric iron in the electrolyzed solution, and the ferric iron is reduced to the ferrous condition, which again conditions the electrolyte for further copper deposition and acid and ferric iron regeneration. The second atom of copper of the $Cu_2S$ can be dissolved by maintaining the temperature of the solution rather high, or at about 80 degrees C. But the idea is not so much to get a close extraction of the copper in the high grade sulphide copper concentrate as it is to extract a considerable portion of the copper without roasting and to use the concentrate as a reducing agent for the ferric iron. Partial recovery of the copper in the high grade concentrate before roasting will make possible a higher total copper recovery after roasting.

Of the 60% copper in the high grade concentrate, from 50% to 75% is easily recoverable without roasting. The raw residue, enriched in sulphur and containing from 10% to 25% copper, for example, is then roasted, with the low grade concentrate, and leached.

In order to prepare the raw high grade sulphide concentrate residue for roasting, it is desirable to remove as much water or solution as possible, and this usually necessitates filtering. Since the residue contains some acid and some soluble copper, it is desirable to neutralize the acid and precipitate the soluble copper, so that the residue may be filtered in an ordinary filtering apparatus, which need not be acid resisting. This procedure avoids excessive washing of the residue and the precipitation from a large volume of lean wash water. A small amount of caustic lime will answer the purpose of neutralization and precipitation. The precipitated copper remains in the residue and is recovered later in the process.

The sulphur dioxide from the roasting furnace is used in the $SO_2$ reducers to reduce the ferric iron in the electrolyte produced by the deposition of the copper. Reducers, such as that described in my Patent No. 1,528,204, Mar. 3, 1925, are preferred. A pool of the electrolyte is treated with the gas, in a closed chamber, by spraying the electrolyte into the gas confined over the pool. In this way the pool of electrolyte is all the while saturated with the gas, while oxygen, which is only slightly soluble in water, is not very active. The sulphur dioxide exhausted from the reducers, and containing only a small percentage of the gas, may be conducted to the oxidizer of the ore leaching circuit, where it may be used to regenerate ferric iron and acid. The apparatus preferred for this oxidizing action of the sulphur dioxide in the presence of a large amount of air or oxygen is described in my Patent No. 1,365,034, Jan. 11, 1921, and in my pending application Serial No. 52,809, filed August 27, 1925. By the use of this apparatus, under these conditions, the $SO_2$ acts as an oxidizer.

The excess acid solution from the treatment of the concentrate is transferred to the treatment of the original ore, and this furnishes enough excess acid to leach the copper from its oxide combinations at practically no extra cost.

If the copper concentrate is roasted so as to make a very high percentage of the copper in the roasted ore water soluble, about three pounds of excess acid will be regenerated per pound of copper deposited, using sulphur dioxide, or copper sulphide, or both combined, as the reducing agent. This excess acid from the treatment of the concentrate, combined with the acid regenerated in the deposition of the copper from the solutions obtained from the original ore, will give sufficient acid to leach the copper from the oxides, and allow for the necessary loss in wash water and neutralization of the acid, as described.

Assuming that three pounds of acid is regenerated per pound of copper produced, it will be seen that in the precipitation of the 20 pounds of copper from the oxidized mineral in the ore and 20 pounds from the sulphide mineral, there would be a total of 120 of acid regenerated, while that consumed in the extraction of 20 pounds of copper from the oxide mineral in the ore, would amount to only 80 pounds acid, assuming a consumption of four pounds of acid per pound of copper extracted. This would be an abundance of excess so that some solution could be wasted to equalize the volume due to the small addition of pure water to the rod mill.

If the acid consumption is more than four pounds per pound of copper dissolved from the oxidized ore, the margin will be somewhat less, and if the acid consumption is somewhat excessive, extra acid may be regenerated in the oxidizer by treating the solution with sulphur dioxide in the presence of a large amount of air in a finely subdivided or atomized condition.

The action of ferric iron on copper sulphide concentrate, either in the form of precipitate as obtained by precipitating copper from lean or foul solutions with a sulphide precipitation agent such as hydrogen sulphide, or as obtained from ore concentration to get a high grade concentrate consisting largely of chalcocite, is described in my Patents No. 1,340,826, May 18, 1920; No. 1,489,121, April 1, 1924; and No. 1,528,307, Mar. 3, 1925.

I claim:

1. A copper extraction process comprising grinding the ore with a relatively small amount of water, then adding a dilute acid solution to the finely ground ore, classifying the resulting acid ore pulp to remove the oversize, reducing the acid content of the oversize, and adding the oversize to new ore to be reground.

2. A copper extraction process comprising grinding the ore with a relatively small amount of water, then without removing the water used in the grinding adding a dilute acid solution to the finely ground ore, classifying the resulting acid pulp to remove the oversize, adding a precipitant for the soluble copper in the oversize, and then regrinding the oversize.

3. A copper extraction process comprising grinding the copper ore with a relatively small amount of water, then without removing the water used in the grinding adding a dilute acid solution to the finely ground ore, classifying the resulting acid pulp to remove the oversize, applying a neutralizing and precipitation agent to the oversize and then regrinding it, separating the resulting copper solution from the leach residue, precipitating the copper from the leach solution, and returning the leach solution to the classifier to pass through another cycle.

4. In the treatment of mixed oxide and sulphide ore of copper, an extraction process comprising, grinding the ore, classifying the finely ground ore in an acid solution, returning the oversize to be reground, separating a portion of the soluble copper from the leach residue, precipitating another portion of the soluble copper in the leach residue, applying a flotation agent to the leached residue, and then subjecting the leached residue to flotation to recover the copper in its sulphide combinations.

5. A copper extraction process comprising leaching copper ore with an acid solution containing ferric iron, electrolyzing the resulting copper solution to deposit the copper and regenerate acid and ferric iron, applying sulphur dioxide to the electrolyzed solution to reduce the ferric iron to the ferrous condition, then electrolyzing the solution and allowing the ferric iron to accumulate, and then still further increasing the ferric content of the solution by agitating it in the presence of air and sulphur dioxide, and then returning the solution to the ore to pass through another cycle.

6. A copper extraction process comprising leaching copper ore with an acid solution containing ferric iron, electrolyzing the resulting copper solution to deposit the copper and regenerate acid and ferric iron, applying a reducing agent to the electrolyzed solution to reduce the ferric iron formed by the electrolysis to the ferrous condition, then electrolyzing the solution and allowing the ferric iron produced by the electrolysis to accumulate, and then still further increasing the ferric content of the solution by treating it with an oxidizing agent after electrolysis, and then returning the solution to the ore to pass through another cycle.

7. In the treatment of mixed oxide and sulphide ores of copper, an extraction process comprising, leaching the ore, electrolyzing the resulting copper solution to deposit the copper and regenerate acid, applying a precipitant to the leach residue to precipitate remaining soluble copper, subjecting the leached residue to flotation to separate the sulphides from the gangue, leaching the raw sulphide concentrate with a ferric salt solution to extract a portion of the copper, then roasting and leaching the sulphide concentrate residue to extract the remaining copper, electrolyzing the resulting copper solution to deposit the copper and regenerate acid, and applying the excess acid regenerated in the treatment of the concentrate to the treatment of the mixed ore to extract the copper from its oxide combinations.

8. In the treatment of oxide and sulphide ores of copper, a process comprising concentrating copper ore to obtain a sulphide concentrate, leaching oxidized copper ore with an acid solution, precipitating the copper from the resulting solution, leaching the roasted concentrate with an acid solution, electrolyzing the resulting copper solution to deposit the copper and regenerate acid and ferric iron, applying the sulphur dioxide from the roasting of the sulphide concentrate to the electrolyzed solution whereby a portion of the sulphur dioxide is consumed as a reducing agent for the ferric iron, and then applying the excess sulphur dioxide to the leach solution from which the copper has been precipitated to oxidize ferrous iron to ferric iron, and then returning the solution to the ore.

9. In the treatment of oxide and sulphide ores of copper, the process comprising leaching the oxidized ore with an acid solution, roasting the sulphide ore, leaching the roasted ore with an acid solution, applying the rich sulphur dioxide to a portion of the leach solution as a reducing agent, and then applying the remaining sulphur dioxide to another portion of the leach solution as an oxidizing agent.

10. In the treatment of oxide and sulphide ores of copper, the process comprising roasting the sulphide ore, leaching the ore with an acid solution, precipitating the copper from the resulting leach solution, applying the sulphur dioxide from roasting the sulphide ore to a portion of the leach solution as a reducing agent for the ferric iron, and then applying the excess of sulphur dioxide to another portion of the leach solution in the presence of air to oxidize ferrous iron to ferric iron, and then returning the solution to the ore.

11. In the treatment of oxide and sulphide ores of copper the process comprising, roasting the sulphide ore, leaching the roasted ore with an acid solution, precipitating the copper from the resulting solution, applying a portion of the sulphur dioxide from the roasting of the sulphide ore to a portion of the solution as a reducing agent for ferric iron in the presence of a relatively small amount of air or oxygen, and applying another portion of the sulphur dioxide to another portion of the leach solution as an oxidizing agent for ferrous iron in the presence of a relatively large amount of air or oxygen by intimately mixing the air or oxygen and the solution, and then returning the solution containing ferric iron to the ore.

12. A copper extraction process comprising, concentrating copper ore to produce a high grade sulphide concentrate, leaching low grade copper ore with an acid solution to extract the copper, electrolyzing the resulting copper solution to deposit the copper and regenerate acid and ferric iron, applying the electrolyzed solution containing ferric iron to the unroasted high grade concentrate as a reducing agent for the ferric iron whereby a portion of the copper of the unroasted concentrate is extracted therefrom in the conversion of the ferric iron to ferrous iron, then when a portion of the copper has been extracted from the unroasted high grade concentrate applying a precipitation agent to the partly treated unroasted concentrate, filtering the concentrate, then roasting the high grade concentrate residue, and then leaching the high grade roasted concentrate residue to extract the remaining copper therefrom.

13. A copper extraction process comprising, concentrating copper ore to produce a high grade sulphide concentrate, leaching low grade copper ore with an acid solution to extract the copper, electrolyzing the resulting copper solution to deposit the copper and regenerate acid and ferric iron, applying the electrolyzed solution containing ferric iron to the unroasted high grade sulphide concentrate as a reducing agent for the ferric iron whereby a portion of the copper in the unroasted high grade concentrate is extracted therefrom in the conversion of ferric iron to ferrous iron, then when a portion of the copper has been extracted from the unroasted concentrate roasting the leached high grade concentrate residue, and then leaching the roasted high grade concentrate residue to extract the remainder of the copper.

14. A copper extraction process comprising, concentrating copper ore to produce a high grade copper concentrate, treating the unroasted high grade copper sulphide concentrate with an acid ferric salt solution to extract a portion of the copper, electrolyzing the resulting copper solution containing salts of iron to deposit the copper and regenerate acid and ferric iron, then after a portion of the copper has been extracted roasting the high grade copper concentrate residue, leaching the roasted residue to extract another portion of the copper, electrolyzing the resulting solution to deposit the copper and regenerate acid and ferric iron, and applying the resulting acid ferric iron solution to a fresh lot of unroasted high grade concentrate as a reducing agent for the ferric iron formed by the electrolysis.

15. In the treatment of mixed oxide and sulphide ores of copper an extraction process comprising, grinding the ore, classifying the finely ground ore in an acid solution, separating a portion of the soluble copper from the leach residue, precipitating another portion of the soluble copper in the leach residue, then regrinding the leach residue, and then subjecting the leach residue to flotation to recover the copper precipitated in the residue and to recover the copper in its sulphide combinations in the leach residue.

16. In the treatment of mixed oxide and sulphide ores of copper an extraction process comprising, grinding the ore with a relatively small amount of water, then without removing the water used in wet grinding adding a dilute acid solution to the finely ground ore, separating a portion of the soluble copper from the leach residue and precipitating the copper from the solution, precipitating another portion of the soluble copper in the leach residue, applying a flotation agent to the leached residue, and then subjecting the leached residue to flotation.

17. In the treatment of mixed oxide and sulphide ores of copper an extraction process comprising, grinding the ore with a relatively small amount of water, then without removing the water used in wet grinding adding a dilute acid solution to the finely ground ore, classifying the resulting acid pulp to remove the oversize, reducing the acidity and soluble copper content of the oversize and then regrinding it, separating a portion of the soluble copper from the leach residue and precipitating the copper from the resulting leach solution, precipitating another portion of the soluble copper in the leach residue, applying a flotation agent to the leach residue, and then subjecting the leach residue to flotation to recover the precipitate and the copper in the ore in its sulphide combinations as a sulphide concentrate.

18. A process of treating mixed oxide and sulphide ores of copper comprising, grinding the ore wet, then adding a dilute acid solution to the finely ground wet ore pulp to extract the copper from its oxide combinations, separating a portion of the dissolved copper from the resulting residue, precipitating another portion of the dissolved copper in the leach residue, and then subjecting the leach residue to flotation to extract the copper in its sulphide combinations.

19. A process of treating mixed oxide and sulphide ores of copper comprising, grinding the ore wet, then adding a dilute acid solution to the finely ground wet ore pulp to extract the copper in its oxide combinations, separating a portion of the dissolved copper from the resulting residue, precipitating another portion of the dissolved copper in the leach residue as the sulphide, and then subjecting the leach residue to flotation to extract the sulphide precipitate and the natural sulphide of the ore.

20. A process of treating mixed oxide and sulphide ores of copper comprising, grinding the ore wet, then adding a dilute acid solution to the finely ground wet ore pulp to extract the copper in its oxide combinations, agitating the ore pulp, separating the resulting leach solution from the residue, precipitating the copper from the leach solution and returning the solution to the ore to pass through another cycle, and recovering the copper in its sulphide combinations from the leach residue by flotation.

21. A process of treating mixed oxide and sulphide ores of copper comprising, grinding the ore wet, then adding dilute acid solution to the finely ground wet ore pulp to extract the copper in its oxide combinations and to give the classification desired, classifying the acid ore pulp, separating a portion of the resulting leach solution from the residue, precipitating the copper from the leach solution and returning the leach solution to the classifier, precipitating another portion of the dissolved copper in the leach residue, then subjecting the leach residue to flotation to recover the copper in its sulphide combinations.

22. A process of treating mixed oxide and sulphide ores of copper comprising, grinding the ore wet, then adding dilute acid solution to the finely ground wet ore pulp, agitating the resulting acid ore pulp to dissolve the copper in its oxide combinations, then separating a portion of the solution from the resulting residue, precipitating the copper from the leach solution and returning the solution to the agitator, applying a caustic alkali to the leach residue, and then subjecting the leach residue to flotation to recover the copper in its sulphide combinations.

23. A process of treating mixed oxide and sulphide ores of copper comprising, grinding the ore wet, then adding sufficient acid solution to the finely ground wet ore pulp to give the fluidity desired for leaching by agitation to extract the copper in its oxide combinations, separating the resulting copper solution from the leach residue, precipitating the copper from the solution and returning the solution to the agitator, and treating the leach residue by flotation to recover the copper in its sulphide combinations.

24. A process of treating mixed oxide and sulphide ores of copper comprising, grinding the ore wet, then adding dilute acid solution to the finely ground wet ore pulp to extract the copper in its oxide combinations by agitation, separating a portion of the resulting leach solution from the resulting leach residue, precipitating the copper from the leach solution, applying a caustic alkali to the leach residue, then re-grinding the leach residue, and then subjecting the re-ground leach residue to flotation to recover the copper in its sulphide combinations.

25. A process of treating mixed oxide and sulphide ores of copper comprising, grinding the ore wet, then adding dilute acid solution to the finely ground wet ore pulp, agitating the resulting acid ore pulp to dissolve the copper in its oxide combinations, separating the resulting copper solution from the leach residue, precipitating the copper from the leach solution and returning the solution to the ore, applying a neutralizing and (or) precipitation agent to the leach residue, then re-grinding the leach residue, and then subjecting the leach residue to flotation to recover the copper in its sulphide combinations.

26. A process of treating mixed oxide and sulphide ores of copper comprising, grinding the ore wet, adding dilute acid solution to the finely ground wet ore pulp to give the fluidity desired for agitation and for the extraction of the copper in its oxide combinations, separating the resulting leach solution from the residue, re-grinding the leach residue, and then subjecting the leach residue to flotation to recover the copper in its sulphide combinations.

27. A copper extraction process comprising, grinding the ore wet, then adding dilute acid solution to the finely ground wet ore pulp to extract the copper and to give the fluidity for the desired classification, then classifying the acid pulp.

28. A copper extraction process comprising, grinding the ore wet, then adding dilute acid solution to the finely ground wet ore pulp to give the fluidity for the desired classification, classifying the resulting acid ore pulp to remove the oversize, applying a caustic alkali to the oversize, and then re-grinding the oversize.

29. A copper extraction process comprising, grinding the ore wet, then adding dilute acid solution to the finely ground wet ore pulp to give the fluidity for the classification desired and to extract the copper, classifying the acid ore pulp, washing the oversize, and then re-grinding the oversize.

30. A process of treating mixed oxide and sulphide ores of copper comprising, grinding the ore wet, adding dilute acid solution to the finely ground wet ore pulp to give the fluidity desired for agitation and for the extraction of the copper in its oxide combinations, separating the resulting leach copper solution from the residue, electrolyzing the resulting copper solution to deposit the copper and regenerate acid and ferric iron, subjecting the residue to concentration to separate the sulphides from the gangue, separating the resulting sulphide concentrate into a high grade concentrate and into a low grade concentrate, roasting the low grade concentrate, leaching the roasted low grade concentrate to extract the copper therefrom, electrolyzing the resulting copper solution to deposit the copper and regenerate acid and ferric iron, treating the electrolyte with the high grade unroasted concentrate to reduce the ferric iron to the ferrous condition with the simultaneous extraction of an equivalent of copper from the unroasted high grade concentrate, then when the desired amount of copper has been extracted from the unroasted high grade concentrate roasting the high grade concentrate residue, and then leaching it to extract the remainder of the copper.

31. A process comprising, concentrating copper ore into a low grade and a high grade concentrate, roasting the low grade concentrate, leaching the roasted low grade concentrate with an acid solution containing salts of iron, electrolyzing the resulting copper solution to deposit the copper and regenerate acid and ferric iron, treating the solution with the high grade unroasted concentrate whereby ferric iron is reduced to the ferrous condition and a portion of the copper extracted from the unroasted high grade concentrate, then roasting the high grade concentrate residue and leaching it to extract the remaining copper.

32. A process comprising, concentrating copper ore into a low grade and a high grade concentrate, roasting the low grade concentrate, leaching the roasted low grade concentrate, treating the unroasted high grade concentrate with the leach solution obtained from leaching the roasted low grade concentrate, then adding the leached unroasted high grade concentrate to a new portion of low grade concentrate, roasting the mixture, and then leaching the roasted mixture to extract the copper therefrom.

33. A process comprising leaching copper ore with a dilute acid solution, separating a portion of the resulting copper solution from the ore as a rich copper solution, washing the ore, precipitating the copper in the wash water as the hydroxide, and then re-dissolving the precipitated copper hydroxide in the rich copper solution.

34. A process of treating copper ore comprising, leaching the ore with an acid solution containing ferric iron to extract a portion of the copper, electrolyzing the resulting copper solution to deposit a portion of the copper and regenerate acid and ferric iron, then subjecting the electrolyzed solution to the action of sulphur dioxide in the presence of air or oxygen to increase the ferric content of the solution, then returning the solution to the ore to extract another portion of the copper, and repeating the cycle until the copper in the ore is sufficiently extracted.

35. A process of treating copper ore containing the copper in form partly soluble and partly insoluble in a copper leaching solution comprising, leaching the ore with a solvent for the copper, separating a portion of the dissolved copper from the leached residue and precipitating the copper therefrom, precipitating another portion of the dissolved copper in the leached residue, then subjecting the leached residue to flotation to recover the copper precipitated therein and the copper insoluble in the leaching solution.

36. A process of treating copper ore containing copper in partly soluble and partly insoluble form in a copper leaching solution comprising, leaching the ore with a solvent for the soluble copper, separating a portion of the dissolved copper from the leached residue and precipitating the copper therefrom, precipitating another portion of the dissolved copper in the leached residue as the sulphide, then subjecting the leached residue to flotation to recover the copper precipitated therein and the copper insoluble in the leaching solution.

37. A process of treating mixed oxide and sulphide copper ore comprising, leaching the ore with an acid solution to extract the copper in its oxide combinations, separating a portion of the dissolved copper from the leached residue and precipitating the copper therefrom, precipitating another portion of the dissolved copper in the leached residue, then subjecting the leached residue to flotation to recover the copper precipitated therein and the copper insoluble in the leaching solution as a copper concentrate, roasting the resulting copper concentrate, leaching the roasted concentrate with an acid solution to extract the copper, electrolyzing the resulting copper solution to deposit the copper and regenerate acid, returning a portion of the regenerated acid solution to the roasted copper concentrate, and applying another portion of the regenerated acid solution to the mixed oxide and sulphide ore to extract the copper in its oxide combinations.

38. A process of treating mixed oxide and sulphide copper ore comprising, leaching the ore with an acid solution to dissolve the copper in its oxide combinations, separating the resulting copper solution from the leached residue and precipitating the copper therefrom, subjecting the leached residue to concentration to separate the copper in its sulphide combinations from the gangue, roasting the sulphide concentrate, leaching the roasted concentrate with an acid solution to extract the copper, electrolyzing the resulting copper solution to deposit the copper and regenerate acid, returning a portion of the regenerated acid solution to the roasted concentrate and applying another portion to the mixed oxide and sulphide copper ore to extract the copper in its oxide combinations.

39. A process of treating mixed oxide and sulphide copper ore comprising, leaching the ore with an acid solution to dissolve the copper in its oxide combinations, separating the resulting copper solution from the leached residue and precipitating the copper therefrom, treating the leached residue to separate the copper in its sulphide combinations from the gangue, roasting the resulting copper sulphide concentrate, leaching the roasted concentrate with an acid solution to extract the copper, electrolyzing the resulting copper solution containing salts of iron to deposit the copper and regenerate acid and ferric iron, applying the sulphur dioxide from the roasting of the sulphide concentrate to the electrolyte as a reducing agent for the ferric iron and repeating the cycle of electrolysis and reduction whereby excess acid is produced over that required to extract the copper from the roasted concentrate, and applying the excess acid so produced to the mixed oxide and sulphide copper ore to extract the copper in its oxide combinations.

WILLIAM E. GREENAWALT.